(12) United States Patent
Tartal et al.

(10) Patent No.: US 11,974,687 B2
(45) Date of Patent: May 7, 2024

(54) INTELLIGENT ITEM RECEPTACLE

(71) Applicant: United States Postal Service, Washington, DC (US)

(72) Inventors: William Albert Tartal, Baltimore, MD (US); Gabriel Michael Yessin, Arlington, VA (US); Mihae Mukaida, Paonia, CO (US); Matthew Anthony Borgatti, Brooklyn, NY (US); John David Cranor, III, Fort Collins, CO (US); Nathan Lachenmyer, Las Vegas, NV (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/169,690

(22) Filed: Feb. 15, 2023

(65) Prior Publication Data

US 2023/0190025 A1  Jun. 22, 2023

Related U.S. Application Data

(63) Continuation of application No. 17/037,343, filed on Sep. 29, 2020, now Pat. No. 11,594,018.
(Continued)

(51) Int. Cl.
*G06K 9/00* (2022.01)
*A47G 29/12* (2006.01)
(Continued)

(52) U.S. Cl.
CPC .............. *A47G 29/20* (2013.01); *A47G 29/12* (2013.01); *A47G 29/1207* (2013.01);
(Continued)

(58) Field of Classification Search
CPC ...... G06V 10/10; G06V 10/12; G06V 10/141; G06V 10/147; G06V 10/22; G06V 10/225; G06V 10/40; G06V 10/70; G06V 10/74; G06V 10/88; G06V 20/00; G06V 20/64; G06T 7/00; G06T 7/0002; G06T 7/0004; G06T 7/20; G06T 7/50; G06T 7/60;
(Continued)

(56) References Cited

U.S. PATENT DOCUMENTS 5,754,670 A     5/1998  Shin et al.
5,818,336 A  *  10/1998 Varga ................. A47G 29/1207
                                                                  340/539.1
(Continued)

*Primary Examiner* — Eric Rush
(74) *Attorney, Agent, or Firm* — Knobbe, Martens, Olson & Bear LLP

(57) ABSTRACT

An intelligent item receptacle, system, and method for providing supplemental media content in response to depositing an item having media indicia disposed thereon. An intelligent item receptacle includes an item receptacle securely enclosing an interior volume, an item sensor configured to detect an inserted item, a camera within the interior volume configured to capture an image of the item, and an output configured to play audio or visual content to bystanders outside the item receptacle. Processing circuitry within the item receptacle analyzes the image to determine if the media indicia are present on the item and, if present, causes the output to play the audio or visual content associated with the media indicia.

16 Claims, 8 Drawing Sheets

Related U.S. Application Data

(60) Provisional application No. 62/910,005, filed on Oct. 3, 2019.

(51) Int. Cl.
| | |
|---|---|
| *A47G 29/14* | (2006.01) |
| *A47G 29/20* | (2006.01) |
| *B07C 3/00* | (2006.01) |
| *G06T 7/20* | (2017.01) |
| *G06T 7/70* | (2017.01) |
| *G06V 10/12* | (2022.01) |
| *G06V 10/141* | (2022.01) |
| *G06V 10/147* | (2022.01) |
| *G06V 10/40* | (2022.01) |
| *G06V 10/88* | (2022.01) |
| *G06V 20/00* | (2022.01) |
| *G06V 20/64* | (2022.01) |
| *G06Q 40/12* | (2023.01) |

(52) U.S. Cl.
CPC ... *A47G 29/12095* (2017.08); *A47G 29/1218* (2013.01); *A47G 29/14* (2013.01); *B07C 3/008* (2013.01); *G06T 7/20* (2013.01); *G06T 7/70* (2017.01); *G06V 10/12* (2022.01); *G06V 10/141* (2022.01); *G06V 10/147* (2022.01); *G06V 10/40* (2022.01); *G06V 10/88* (2022.01); *G06V 20/00* (2022.01); *G06V 20/64* (2022.01); *A47G 2029/12105* (2017.08); *A47G 2029/145* (2013.01); *A47G 2029/148* (2013.01); *A47G 2029/149* (2013.01); *G06Q 40/12* (2013.12)

(58) Field of Classification Search
CPC . G06T 7/70; G06T 7/97; G06Q 10/08; G06Q 10/083; G06Q 10/0832; G06Q 10/0836; G06Q 40/12; G06Q 50/28; A47G 29/00; A47G 29/12; A47G 29/1201; A47G 29/1207; A47G 29/1209; A47G 29/12095; A47G 29/121; A47G 29/1212; A47G 29/1214; A47G 29/1218; A47G 29/122; A47G 29/1225; A47G 29/14; A47G 29/20; A47G 29/22; A47G 29/30; A47G 2029/12105; A47G 2029/1226; A47G 2029/1228; A47G 2029/1229; A47G 2029/145; A47G 2029/146; A47G 2029/148; A47G 2029/149; A47G 2200/14; A47G 2200/143; A47G 2200/146; A47G 2200/22; A47G 2200/223; A47G 2200/226; B07C 3/008; B07C 3/12; B07C 3/14

USPC ....... 382/22–24, 28, 29, 330, 332, 333, 339, 382/400–402, 404, 406, 407, 410–412, 382/414, 100–103, 107, 141–143, 154, 382/165, 173, 175, 181–183, 224, 282, 382/291, 312, 325; 705/22–24, 28, 29, 705/330, 332, 333, 339, 400–402, 404, 705/406, 407, 410–412, 414; 209/509, 209/512, 522, 552, 576, 583, 584, 586, 209/587, 592–594; 206/205; 340/568.1, 340/568.5, 569; 232/2, 7, 17, 19–21, 24, 232/27, 30, 45

See application file for complete search history.

(56) References Cited

U.S. PATENT DOCUMENTS

| | | |
|---|---|---|
| 8,386,347 B2 | 2/2013 | Hoblit |
| 8,757,363 B2* | 6/2014 | Combs ................. B65G 43/10 700/228 |
| 9,208,621 B1 | 12/2015 | Skaaksrud |
| 10,078,808 B1* | 9/2018 | Sibon .................. G06Q 10/083 |
| 10,936,881 B2 | 3/2021 | Olmstead et al. |
| 2003/0119175 A1* | 6/2003 | Stradley .............. G01N 1/2226 435/287.1 |
| 2007/0034694 A1 | 2/2007 | Jensen et al. |
| 2013/0020391 A1 | 1/2013 | Olmstead et al. |
| 2013/0024326 A1 | 1/2013 | Dearing et al. |
| 2014/0346221 A1* | 11/2014 | Pendergast ............ A47G 29/12 232/17 |
| 2015/0193733 A1 | 7/2015 | Bouzit-Benbernou |
| 2017/0091710 A1 | 3/2017 | Van Dyke |
| 2017/0278063 A1 | 9/2017 | Dixon et al. |
| 2018/0046978 A1 | 2/2018 | Tartal et al. |
| 2018/0197140 A1* | 7/2018 | Goja ....................... G06Q 50/28 |
| 2021/0038005 A1* | 2/2021 | Morris .................. A47G 29/30 |

* cited by examiner

US 11,974,687 B2

INTELLIGENT ITEM RECEPTACLE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 17/037,343, filed on Sep. 29, 2020, which claims the benefit of U.S. Provisional Application Ser. No. 62/910,005, filed Oct. 3, 2019, entitled "INTELLIGENT ITEM RECEPTACLE," the entirety of which is incorporated by reference herein.

FIELD

This disclosure relates to item receptacles, and more specifically to item receptacles having item recognition and/or media functionality.

DESCRIPTION OF THE RELATED TECHNOLOGY

Items, such as articles of mail, which can include letters, flats, parcels, and the like, are frequently received into a distribution network at an item receptacle such as a collection box, drop box, or the like. Item receptacles are typically unpowered and have relatively limited functionality, as they may often be located outdoors and away from distribution network facilities or offices.

SUMMARY

In a first aspect, an intelligent item receptacle comprises an interior volume; an item sensor disposed within the interior volume and configured to detect an item in the interior volume, the item having media indicia disposed thereon, the media indicia associated with a portion of audio content or visual content stored in a memory of the intelligent item receptacle, and transmit a first signal in response to detecting the item; a camera disposed within the interior volume and configured to capture an image of the item; an output device; and one or more processors disposed within the interior volume in communication with the at least one sensor, the memory, the camera, and the output device. The one or more processors are configured to receive the first signal from the item sensor, cause the camera to capture the image of the item based on the first signal, analyze the image to detect the media indicia located on the item, and cause the output device to play the portion of audio content or visual content based on detecting the media indicia located on the item.

In some embodiments, the intelligent item receptacle further comprises an intake in communication with the internal volume configured to pass an item from the intake into the internal volume, and an intake sensor disposed within the intake including an optical sensor in substantially continuous operation proximate the intake, the intake sensor configured to detect the insertion of the item into the intake, wherein the one or more processors are further configured to activate the item sensor based on the detection of the insertion of the item by the intake sensor. In some embodiments, the item sensor comprises a first break beam optical sensor configured to transmit the first signal in response to an interruption of at least one beam of the first break beam optical sensor, and a second break beam optical sensor disposed downstream from the first break beam optical sensor along a gravity-assisted item path between the intake and a floor of the item receptacle, the second break beam optical sensor configured to transmit a second signal in response to an interruption of at least one beam of the second break beam optical sensor. In some embodiments, the one or more processors are further configured to determine a speed of the item moving in the internal volume based at least in part on timestamps associated with the first signal and the second signal. In some embodiments, the one or more processors are further configured to control a time at which the camera captures the image based at least in part on the speed of the item. In some embodiments, the media indicia comprises a commemorative stamp. In some embodiments, the output device comprises an audio transducer configured to play sound by inducing vibration to an exterior surface of the item receptacle. In some embodiments, the intelligent item receptacle further comprises a jam detector in communication with the one or more processors, the jam detector including an optical sensor configured to detect a stationary item disposed along a gravity-assisted item path upstream of the item sensor. In some embodiments, the one or more processors are further configured to send a signal to a remote computing device or deactivate at least one component of the intelligent item receptacle in response to the stationary item being detected. In some embodiments, the intelligent item receptacle further comprises a light source disposed within the interior volume and configured to illuminate items being imaged by the camera. In some embodiments, the intelligent item receptacle further comprises a second camera disposed within the interior volume, wherein the camera and the second camera are configured to capture images of opposing sides of the item.

In a second aspect, a method of presenting supplemental content comprises detecting, at an intake sensor of a receptacle, the deposit of an item into the receptacle, the item having media indicia disposed thereon, the media indicia associated with a portion of audio content or visual content stored in a memory of the receptacle; detecting, at an item sensor of the receptacle, a first position of the item within the receptacle; determining, based at least in part on the first position of the item, a speed of the item; determining, based at least on the speed of the item, a time delay for an imaging system of the receptacle; capturing at least one image of the item after the time delay; analyzing the at least one image to detect the media indicia located on the item; and causing an output of the receptacle to play the portion of audio content or visual content based on detecting the media indicia located on the item.

In some embodiments, the method further comprises detecting, at a second item sensor of the receptacle, a second position of the item, wherein the speed of the item is determined based on a known distance between the item sensor and the second item sensor, and based on an elapsed time between the detection of the first position and the detection of the second position. In some embodiments, the media indicia comprises a commemorative stamp. In some embodiments, the portion of audio content or visual content comprises audio content, and wherein causing an output of the receptacle to play the portion of audio content or visual content comprises causing an audio transducer to induce vibration in a planar exterior surface of the receptacle. In some embodiments, the method further comprises detecting the deposit of a subsequent item into the receptacle; causing the imaging system to capture at least one image of the subsequent item; and analyzing the at least one image of the subsequent item to determine that the subsequent item does not have the media indicia located thereon. In some embodiments, the method further comprises analyzing the at least one image to detect postage indicia located on the item; measuring a weight of the item within the receptacle; and determining, based at least in part on the postage indicia, that sufficient postage has been paid for the item. In some embodiments, the method further comprises analyzing the at least one image to detect item tracking indicia located on the item; recording an induction scan event associated with the item; and causing a communication interface of the receptacle to send a notification of the induction scan event to a server of a distribution network associated with the receptacle. In some embodiments, the method further comprises detecting a stuck item at a jam detector within the receptacle; and in response to detecting the stuck item, sending a notification to a server of a distribution network associated with the receptacle; or deactivating at least one electronic component of the receptacle. In some embodiments, determining the time delay for the imaging system comprises retrieving a predetermined time delay value from a lookup table based at least in part on the determined speed of the item.

BRIEF DESCRIPTION OF THE DRAWINGS

The foregoing and other features of the disclosure will become more fully apparent from the following description and appended claims, taken in conjunction with the accompanying drawings.

DETAILED DESCRIPTION

Figure 1:
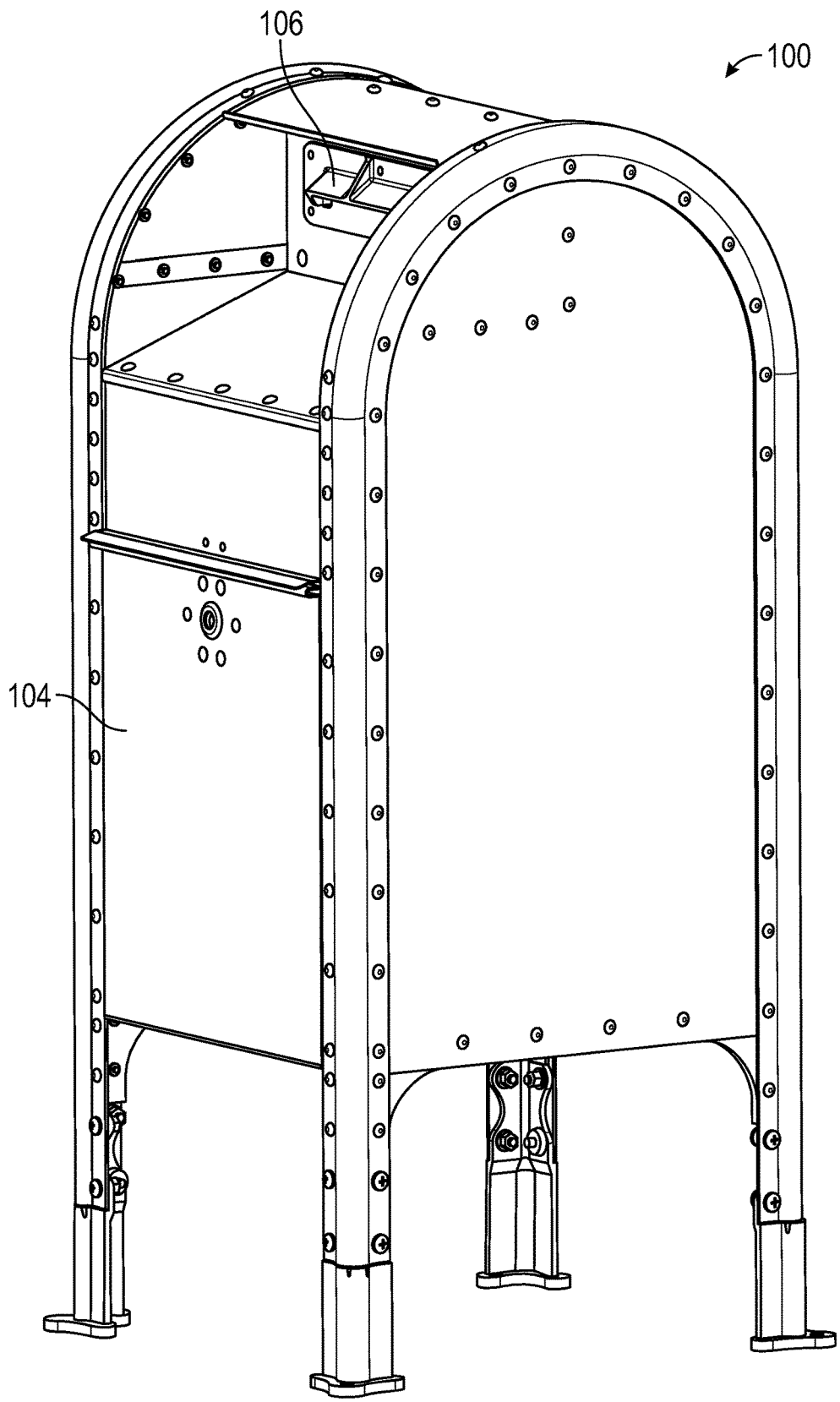
FIG. 1 is a perspective view of an example item receptacle.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

The systems and methods described herein provide for enhanced functionality of item receptacles. The items deposited at an item receptacle may include items of various size and shape, such as letters, flats, and parcels. Articles of mail such as magazines and catalogs, which are too long in one direction to be considered a standard sized letter, are often called flats. Senders may deposit items individually in an item receptacle, where they are stored until a carrier or other agent of the distribution network opens the receptacle and retrieves the deposited items for distribution to their intended destinations. Typical item receptacles for receiving deposited items into a distribution network may include, for example, collection boxes located in public areas such as sidewalks, parks, squares, plazas, malls, at distribution facilities, such as post offices, or any other public or semi-public location. Existing item receptacles typically have little to no functionality other than receiving and securely containing the items deposited therein.

The intelligent item receptacles described herein provide enhanced functionality, including item detection and recognition features. In some embodiments, one or more sensors within an intelligent item receptacle are configured to detect the insertion of an item and/or the receipt of an item into an internal volume of the item receptacle. The sensors may further detect the deposited item as it travels within the item receptacle to determine a location and/or speed of the item as it travels within the interior volume of the item receptacle. An imaging system within the item receptacle can capture one or more images of the item as the item is inserted into the receptacle, as the item moves within the receptacle, and/or once the item has been received into the receptacle. In some embodiments, the imaging system images the item based on output from the sensors and processes the one or more images to identify the item based on postage or other indicia located on a surface of the item. If the item is recognized or meets one or more given criteria, the intelligent item receptacle may initiate one or more additional actions based on the recognition or detected criteria. For example, the item receptacle may present media to the sender such as a sound recording, a visual display, a multimedia presentation, etc. In other examples, the item receptacle may be configured to verify postage, confirm receipt of the item, communicate with a remote server based on the recognized item, etc.

In some non-limiting example embodiments, the intelligent item receptacles disclosed herein may provide an enhanced media experience for a particular item or indicia on an item inserted into the item receptacle. In some embodiments, the particular item or indicia can be a commemorative envelope, stamp or other indicia. For example, a customer may purchase a special commemorative item, or an item having a stamp thereon, dedicated to a well-known musician, artist, human or non-human celebrity, event, historical figure, country, state, city, planet, sport, athlete, etc. The item may have a particular commemorative image or writing thereon. In some embodiments, the customer may affix the commemorative stamp to a mailpiece and insert the mailpiece into an intelligent item receptacle in a public location. As will be described in greater detail, the intelligent item receptacle can detect or image one or more features of the inserted mailpiece internally, for example, by identifying the commemorative stamp on the mailpiece. Based on identifying the commemorative stamp, the intelligent item receptacle presents media content such as an audio, visual, or audiovisual recording associated with the subject of the commemorative stamp (e.g., an audio recording of an interview with the subject or an associate of the subject, a piece of music recorded by a musician subject, a video of a performance or a reenactment of an event, etc.). Because the customer at some point decided to purchase commemorative stamps or item associated with the particular subject, it is likely that the customer will find the associated media content interesting. In some implementations, the intelligent item receptacle may be configured to play one of several different stored portions of media content each time the same type of commemorative stamp is detected, further incentivizing customers to purchase a number of the commemorative stamps and use them to mail subsequent mailpieces in hopes of hearing or seeing several or all of the available portions of media content associated with the subject of the commemorative stamps. Decorative coverings or other indicia on the outside of the intelligent item receptacles associated with the subject may further serve to indicate to customers which item receptacles are compatible intelligent item receptacles that will play media content.

In another non-limiting example, a customer may have an item, such as a mailpiece, that has indicia or an identifier thereon that is associated with a particular theme, company, campaign, such as a marketing campaign, sale, and the like. The indicia or identifier on the item can be detected in or by the item receptacle, and an experience can be generated, similar to those described above. In some embodiments, the item receptacle can be connected to the distribution network and can communicate the indicia or identifier on the item. This can be done for tracking the item, induction scans, etc. The item's indicia or identifier can be linked to an account or identifier for a sender, and the distribution network can update a sender's account, send notifications, provide incentives, and the like, to the sender based on the detection of the indicia or identifier in the item receptacle.

Although the present disclosure describes systems and devices for receiving articles of mail, such as letters, packages, or flats, it will be apparent to one of skill in the art that the disclosure presented herein is not limited thereto. For example, the development described herein may have application in a variety of item receiving applications.

Figure 2:
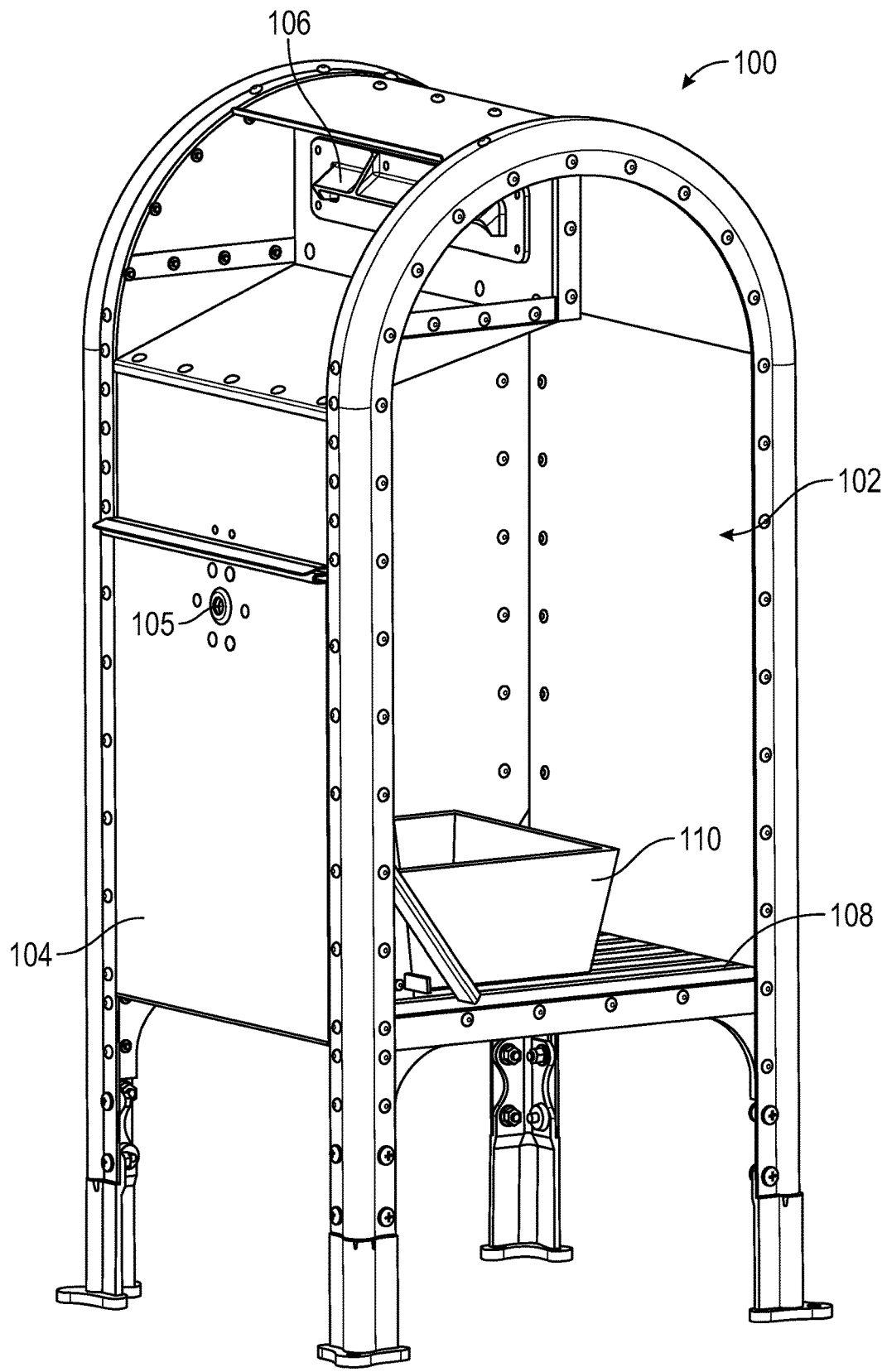
FIG. 2 is a partial cutaway view of the example item receptacle of FIG. 1.

An example of an item receptacle 100 that may be used in some embodiments is depicted in FIGS. 1 and 2. The item receptacle 100 generally surrounds an interior volume 102 in which items may be stored. The item receptacle 100 includes a door 104 and an item intake 106 providing access to the interior volume 102. Items deposited into the item receptacle 100 may fall to rest in a pile or stack directly on the floor 108 of the item receptacle 100, and/or may fall into a tray 110 located within the interior volume 102. In some embodiments, the floor 108 of the item receptacle 100 includes one or more pressure sensors configured to detect the weight of a deposited item.

The door 104 allows an agent of the distribution network to access the interior volume 102. For example, an item carrier may open the door 104 to retrieve the items that have been deposited into the item receptacle 100 since the last collection occurred. The door 104 includes a lock 105 to prevent access to the interior volume 102 other than by authorized agents of the distribution network. In various embodiments, the lock 105 may be a mechanical lock configured to be opened by a key, and/or may be an electronic lock configured to be opened by a wireless signal provided by a mobile device in the possession of an item carrier or other agent of the distribution network.

The item intake 106 allows senders to deposit items into the item receptacle 100. Although illustrated in FIGS. 1 and 2 as a slot for letters or flats, in some embodiments the item intake 106 may be a hinged door, a rotary drum, or other type of item intake structure. The item intake 106 may also include one or more anti-theft features to prevent items from being removed from the item receptacle 100 via the item intake 106.

Figure 3:
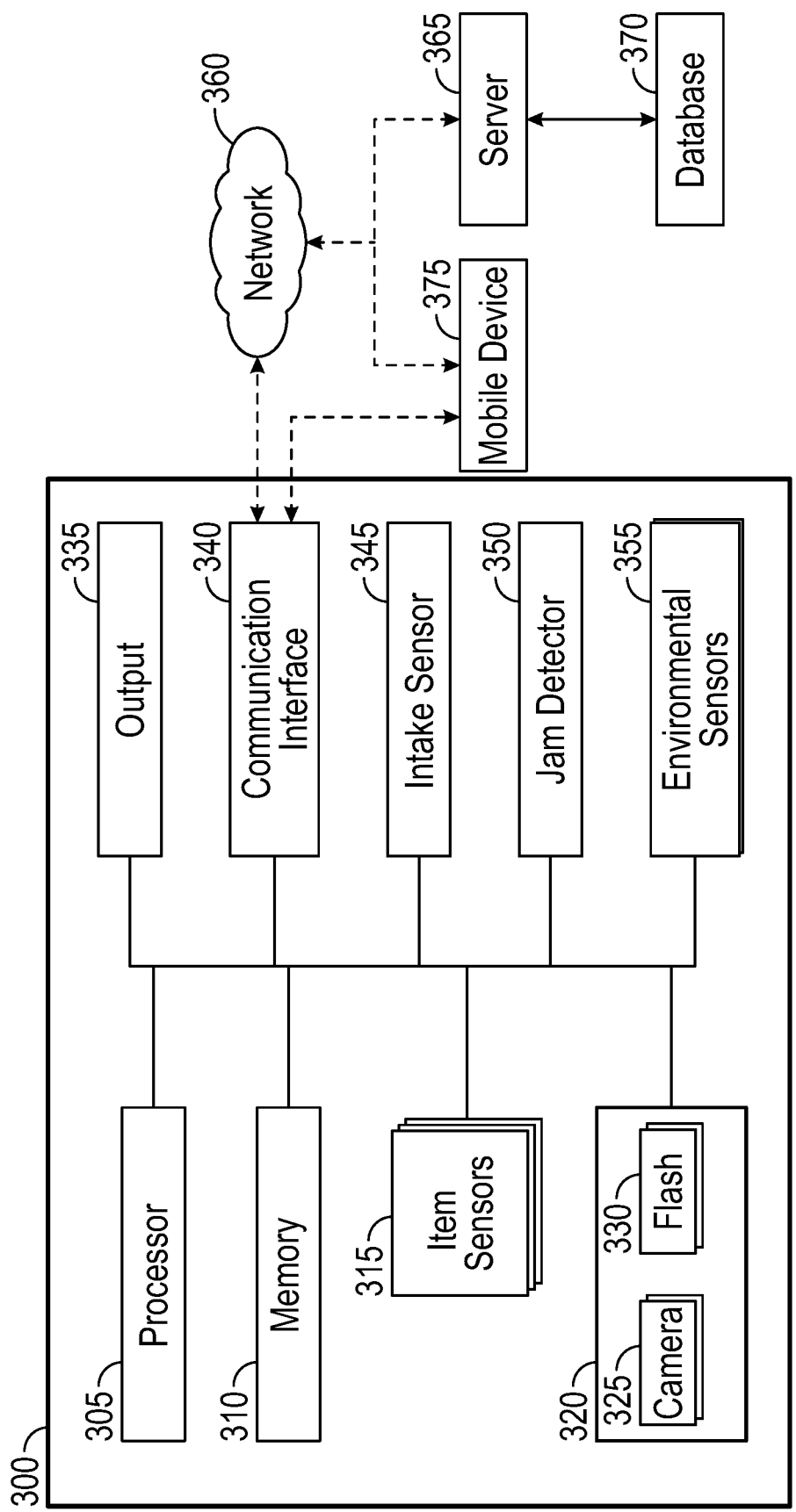
FIG. 3 is a block diagram schematically illustrating components of an intelligent item receptacle within a distribution network.

FIG. 3 is a block diagram schematically illustrating the components of an intelligent item receptacle 300 within a distribution network. The exterior of the intelligent item receptacle 300 may be a collection box such as the item receptacle 100 depicted in FIGS. 1 and 2. For example, in some embodiments the intelligent item receptacle may include one or more internal components installed within an existing collection box or other item receptacle. The intelligent item receptacle 300 can include a processor 305, a memory 310, one or more item sensors 315, an imaging system 320, an output 335, a communication interface 340, an intake sensor 345, a jam detector 350, and one or more environmental sensors 355. The imaging system 320 includes one or more cameras 325 and one or more flashes 330. It will be understood that some embodiments of the intelligent item receptacle 300 may not include all of the components depicted in FIG. 3 and/or may include additional components not depicted in FIG. 3. The intelligent item receptacle 300 may further be in wired or wireless communication via a network 360 with a server 365 and/or a database 370 remote from the intelligent item receptacle 300, and/or in wired or wireless communication directly or via the network 360 with a mobile device 375.

The processor 305 may include one or more CPUs, controllers, or other processing circuitry in communication with and configured to control and receive input from any or all of the other components of the intelligent item receptacle 300. For example, the processor 305 may be configured to store and retrieve data from the memory 310 and to control the imaging system 320 (e.g., the cameras 325 and/or the flashes 330) and the output 335. The processor 305 may be configured to receive data from the item sensors 315, the intake sensor 345, the jam detector 350, and/or the environmental sensors 355. In some embodiments, the processor 305 is configured to control audio or visual media played or displayed by the output 335. The processor 305 is further configured to communicate with the network 360 via the communication interface 340.

The item sensors 315 are configured to detect the location, progress, and/or speed of items entering or traveling within the intelligent item receptacle 300. The item sensors 315 may be, for example, electro-optical position sensors, light gate sensors, break beam optical sensors, photoelectric sensors, or any other type of sensor capable of detecting the presence or proximity of an object. In some embodiments, the item sensors 315 are disposed downstream of an item intake of the intelligent item receptacle 300 such that all or substantially all items placed into the item intake will pass and trigger the item sensors 315 as they travel along a gravity-assisted path from the item intake to a resting position near the bottom of the intelligent item receptacle 300. In the example of a break beam optical sensor, an item passing one of the item sensors 315 will interrupt a light beam created by the sensor, causing the sensor to send a signal to the processor 305 indicating that the sensor has been triggered. In some embodiments, where the intelligent item receptacle 300 includes more than one item sensor 315, the time difference between the signals from the item sensors 315 may be used to calculate, at the processor 305, a speed of the item and/or a time at which the item will pass into the field of view of a camera 325 such that the item can be reliably imaged. Accordingly, the detection signals sent from the item sensors 315 to the processor 305 may further include timestamps, and/or may be timestamped at the time of receipt of the signals at the processor 305. The item sensors 315 may be in continuous operation or may be activated based on a detection event elsewhere, such as the detection of an item being placed into the intelligent item receptacle 300 (e.g., by the intake sensor 345).

The imaging system 320 is configured to image items deposited in the intelligent item receptacle 300. The imaging system 320 includes one or more cameras 325 and one or more flashes 330 or other illumination devices. Cameras 325 may be positioned to image a space downstream of the item sensors 315 such that an item deposited in the intelligent item receptacle 300 passes through the field of view of the cameras 325 after it passes the item sensors 315. The flashes 330 are disposed so as to illuminate items within the field of view of the cameras 325. The flashes 330 may include any suitable light source such as incandescent lamps, light-emitting diodes (LEDs), or the like. The flashes 330 can be synchronized with the cameras 325 such that the flashes 330 illuminate at the same time or shortly before the cameras 325 capture one or more images of the item.

The imaging system 320 is configured to capture images under control of the processor 305. For example, the processor may send a control message that causes the flashes 330 to illuminate the field of view of the cameras 325 and causes the cameras 325 to capture one or more images. The processor 305 can send control messages to the imaging system 320 to operate at a specified time based on input from the item sensors 315 and the intake sensor 345. In some embodiments, the control message may cause the cameras 325 to capture a sequence of images at relatively short intervals to increase the probability of capturing at least one high quality image in which the item is substantially within the field of view of the cameras 325. After capturing the image or images, the imaging system 320 sends the captured image or images to the processor 305 and/or to the memory 310.

The intake sensor 345 is configured to detect items being placed into the intelligent item receptacle 300. Thus, the intake sensor 345 may be disposed at or near the item intake of the intelligent item receptacle 300. Similar to the item sensors 315, the intake sensor 345 may be any type of item sensor such as an electro-optical position sensor, a light gate sensor, a break beam optical sensor, a photoelectric sensor, etc. In some embodiments, the intake sensor 345 may be a mechanical sensor, including a component such as a flap, lever, pivoting member, or other structure configured to move when a deposited item contacts the structure along its path from the item intake to a resting position within the intelligent item receptacle 300. The deposited item may move along an intake path due to a force applied to the item by a depositor, and/or assisted by gravity. When an item is detected at the intake sensor 345, the intake sensor 345 sends a signal to the processor 305 indicating that an item has been detected. In response to the signal, the processor 305 may activate the item sensors 315 such that the item sensors 315 will subsequently detect the item as it passes.

The output 335 may include an audio output device and/or a visual output device. An audio output device may be a speaker, a sound transducer in contact with a surface of the intelligent item receptacle 300 and configured to transfer vibration to the surface of the intelligent item receptacle 300 to produce a sound, or the like. A visual output device may include a display screen, one or more colored lights such as incandescent or LED lights, etc. The output 335 can be configured to play a sound and/or provide a visual indication or visual content based on the deposit of an item. As described in greater detail with reference to FIG. 8, the sound and/or visual indication or content presented by the output 335 may include, for example, a segment of audio, visual, or audiovisual content associated with a particular commemorative stamp or other postage indicia identified on a deposited item, an audio, visual, or audiovisual indication of postage verification or of insufficient postage detected on a deposited item, an audio, visual, or audiovisual indication of acceptance verification of the item, etc.

The communication interface 340 is configured to communicate via wired or wireless communication with one or more external and/or remote computing devices such as a server 365 of the distribution network or a mobile device 375 (e.g., a mobile delivery device carried by an item carrier or other agent of the distribution network). The communication interface may accordingly provide for communication between the processor 305 and other connected components of the distribution network. In some embodiments, the communication interface 340 is configured to communicate with the server 365 and/or one or more mobile devices 375 via a network 360 such as the internet. The communication interface 340 may communicate with the network 360 via mobile data connection, Wi-Fi, or any other wired or wireless communication protocol. In some embodiments, the communication interface 340 is configured to communicate directly with the mobile device 375 via Wi-Fi, Bluetooth, near-field communication (NFC), radio frequency identification (RFID), or the like.

The communication interface 340 can be used to provide the media, operating instructions, customized material, promotion specific audio or video, or other content which is provided in response to detecting the item in the item receptacle. For example, during the time of a first promotion with a commemorative stamp, the audio to be played when an item having the commemorative stamp thereon can be loaded to the memory 310 via the communication interface. This can be done by plugging in to a port in the communication interface, or via a wireless connection where the communication interface is configured for wireless communication. As the promotion or other software of the item receptacle 300 needs to update or change, this can be accomplished via the communication interface 340.

The jam detector 350 is configured to detect the presence of items between the item intake and the item sensors 315 that have become stuck and that may obstruct or otherwise prevent normal operation of the item sensors 315. Similar to the item sensors 315, the jam detector 350 may include any type of item sensor such as an electro-optical position sensor, a light gate sensor, a break beam optical sensor, a photoelectric sensor, etc. In some embodiments, the jam detector 350 is configured to operate continuously, periodically, or on an event-based schedule. For example, the jam detector 350 may activate every 5 seconds, every 10 seconds, every 30 seconds, every minute, or at longer intervals. In another example, the jam detector 350 may activate each time an item is detected at the intake sensor 345, following a suitable time delay to allow the item to pass the jam detector 350 and the item sensors 315 (e.g., the jam detector 350 may activate 5 seconds, 10 seconds, etc. after detection of an item, such that an item still in the vicinity of the jam detector 350 after such time delay indicates the presence of a jam). If a jam is detected at the jam detector 350, the jam detector 350 sends a signal to the processor 305 indicating that a jam has been detected. In response to the jam detection signal, the processor may deactivate one or more other components of the intelligent item receptacle 300, such as the item sensors 315, the intake sensor 345, the output 335, and/or the imaging system 320, so as to prevent constant activation of other sensors, repeated image capture when an item is not in front of the cameras 325, and/or repeated or continuous activation of the output 335. The processor 305 may further cause the communication interface 340 to send a signal to the server 365 and/or a mobile device 375 of a nearby item carrier or other distribution network agent indicating an error at the intelligent item receptacle 300, such that an agent of the distribution network may be dispatched to clear the jam, remove the deposited items, and/or deactivate the intelligent item receptacle 300.

Environmental sensors 365 may include, for example, temperature and/or humidity sensors located within the interior volume of the intelligent item receptacle 300. The environmental sensors 365 are configured to monitor environmental conditions within the interior of the intelligent item receptacle 300. The sensors may provide environmental readings to the processor 305 constantly, periodically, or an event-based schedule. For example, in some embodiments the intelligent item receptacle 300 may detect that a temperature-controlled item has been deposited and may responsively measure the temperature and/or humidity within the interior of the intelligent item receptacle. The measured temperature may be used to determine a time tolerance for the temperature-controlled item. In some embodiments, the processor 305 may further be configured to determine, based on the time tolerance, if the next scheduled pickup of items from the intelligent item receptacle 300 is within the time tolerance of the item. If the next scheduled pickup is not within the time tolerance, the processor 305 may send a signal to the server 365 and/or to a mobile device 375 to request an early or expedite pickup to avoid overheating the item. The measured humidity may be used to determine if excessive moisture is present within the intelligent item receptacle 300.

In some embodiments, the environmental sensors 355 can include weight sensors or other sensors to indicate when a tray or other container for receiving items within the item receptacle is full. For example, when a weight sensor detects a weight above a threshold, the processor 305 can identify that the item receptacle is at capacity or is full. The processor 305 can communicate to the network 360 that the receptacle 300 is full and can schedule or request a delivery resource pick up or unload the items. In some embodiments, the environmental sensor can be a sensor disposed at a certain location within the item receptacle 300 at a level corresponding with a full receptacle. For example, as items are added to the receptacle, an environmental sensor may be triggered as an item falls into an internal container. As items are added to the item receptacle 300, the stack or pile of items in the container grows. If the stack or pile grows large enough, one or more of the items may interrupt a signal or beam of the environmental sensor 345 detecting whether the item receptacle is full. When the interruption becomes constant, the processor 305 can notify the distribution network that the receptacle is full and can schedule or request item pick up. In some embodiments, the weight sensor can also be used to identify individual items deposited in the item receptacle 300 that are above an allowable weight threshold for the item receptacle 300.

In some embodiments, the processor 305 may implement a counter corresponding to a piece count of items deposited since the last time items were picked up. The counter may be incremented based on each detection of an increase in weight, and/or based on each detection of an item at the intake sensor 345 or item sensors 315. The processor 305 may further be configured to determine that an item pick up is needed when the counter reaches a predetermined threshold value. The processor 305 may also implement a running counter that is not reset after item pick-ups, corresponding to a cumulative number of items received at the item receptacle 300. In various embodiments, the cumulative number of items received a plurality of item receptacles 300 may be used to identify where to place additional item receptacles 300. For example, if a first item receptacle 300 frequently becomes full prior to scheduled pick-ups, while a second item receptacle 300 several blocks away only occasionally receives items and rarely becomes full prior to a scheduled pick up, additional available item receptacles 300 may be allocated such that an additional item receptacle 300 is placed near the first item receptacle 300 based on the relative numbers of items received at the first and second item receptacles 300.

In some embodiments, the environmental sensors 355 can include one or more hazardous substance detectors. The hazardous substance detectors may be any known sensors configured to detect known gaseous, liquid, or airborne materials that may be hazardous to humans and/or harmful to mail items. Potential hazardous substances that may be detected can include, but are not limited to, explosives or explosive residues, other combustible or inflammable materials, infectious agents, smoke or other particulate matter, or the like.

In some embodiments, the environmental sensors 355 can include one or more outward-facing exterior cameras disposed at an exterior surface of the item receptacle 300. The exterior cameras may be positioned so as to capture one or more images of a person standing in front of the item receptacle 300 (e.g., a person depositing an item or otherwise interacting with the item receptacle 300). In some embodiments, the exterior camera may be triggered upon detecting an item at the item intake 106, such that the item receptacle 305 captures an image of the person depositing the item. In such implementations, the photo may be stored in association with item information corresponding to the item in the database 370, such as to confirm the identity of the person depositing the item if requested by the sender or recipient of the item. In another example, the exterior cameras may capture an image based on detection of a hazardous substance at the hazardous substance detectors. For example, if intentional sabotage is suspected (e.g., a deposit of an explosive or infectious material, a fire intentionally set within the item receptacle 300 by an arsonist, etc.), exterior photos taken at the time of detection of the hazardous substance may be used to aid law enforcement in identifying the saboteur.

In some embodiments, the item receptacle 300 may be configured to detect fishing events or other unauthorized tampering with the item receptacle 300. A fishing event occurs when an unauthorized person attempts to remove items from the item receptacle 300 by pulling the items out through the item intake 106, such as by lowering an adhesive material on a string into the item receptacle 300 through the item intake 106, and pulling on the string after the adhesive material has stuck to an item in the item receptacle 300 to retrieve the item. The item receptacle 300 may detect fishing events by taking continuous or periodic weight measurements to determine the total weight of items within the item receptacle 300. If a decrease in the weight of the items is ever detected, the processor 305 may generate a fishing alert and may cause an exterior camera to capture an image of any person standing in front of the item receptacle 300. In another example, the processor 305 may generate a fishing alert and cause the exterior camera to capture an image if the item sensors 315 are triggered in a reverse order (e.g., from lowest to highest rather than from highest to lowest as would occur when an item is deposited). Because a decrease in detected weight or a reverse triggering of the item sensors 315 would occur while the item is still being pulled out of the item receptacle 300, a photo taken immediately would be likely to capture an image of the person carrying out the fishing. The fishing alert and/or the photo of the fisher may be communicated to the server 365 and/or to law enforcement via the network 360.

The server 365 of the distribution network is configured to store and retrieve data from a database 370. The database 370 may store various types of information associated with the intelligent item receptacle 300 and/or deposited items. For example, the database 370 may store item information, receptacle location information, carrier route information, media to be played at the output 335, and the like. In some embodiments, the server 365 may push updates to the intelligent item receptacle 300 based on information stored in the data base 370 (e.g., updated computer-executable instructions, new media files to be played at the output 335, etc.). Updates received at the intelligent item receptacle 300 from the server 365 may be stored in the memory 310 of the intelligent item receptacle 300.

Figure 4:
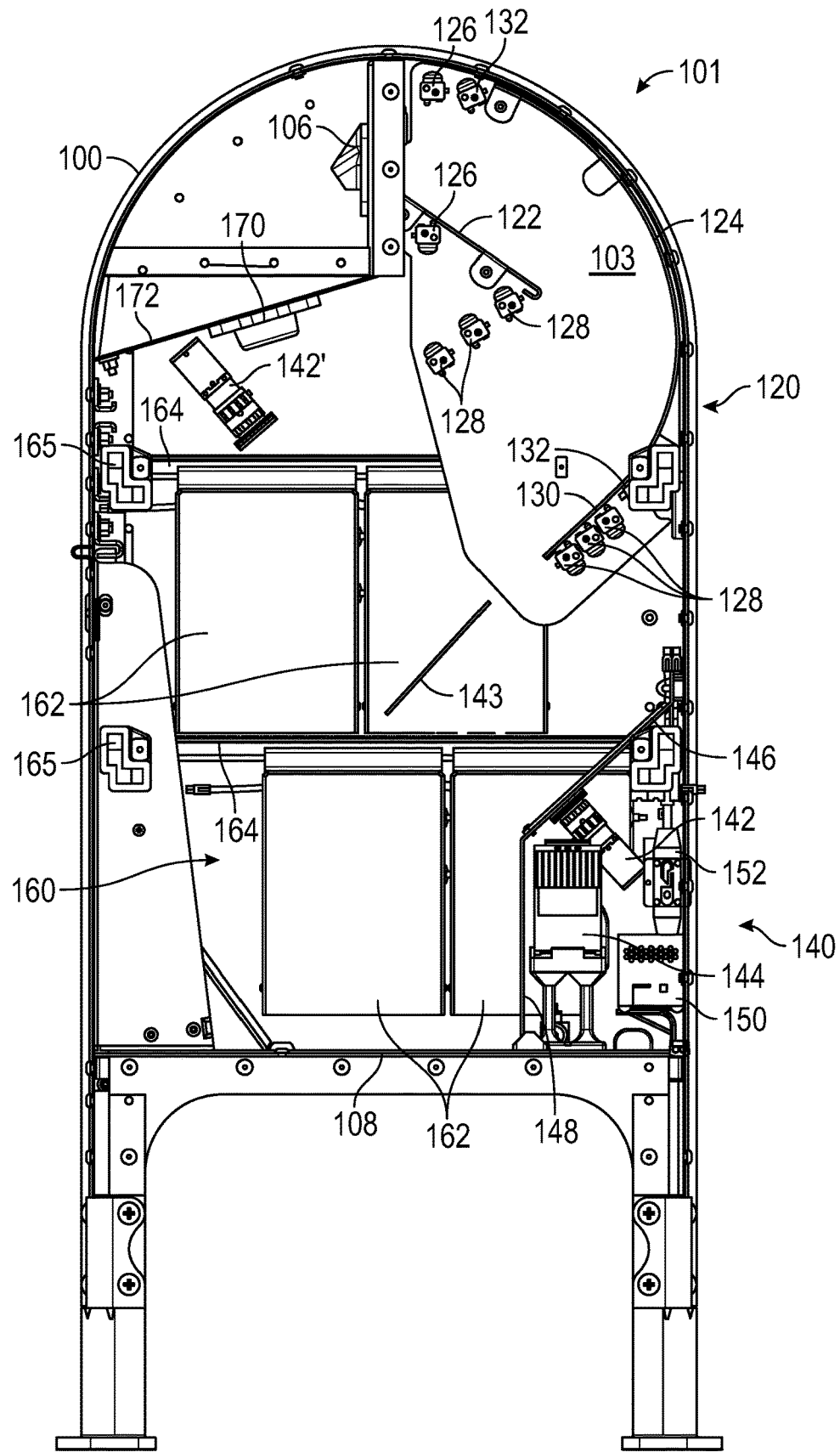
FIG. 4 is a cross-sectional side view of an example embodiment of an intelligent item receptacle.
Figure 5:
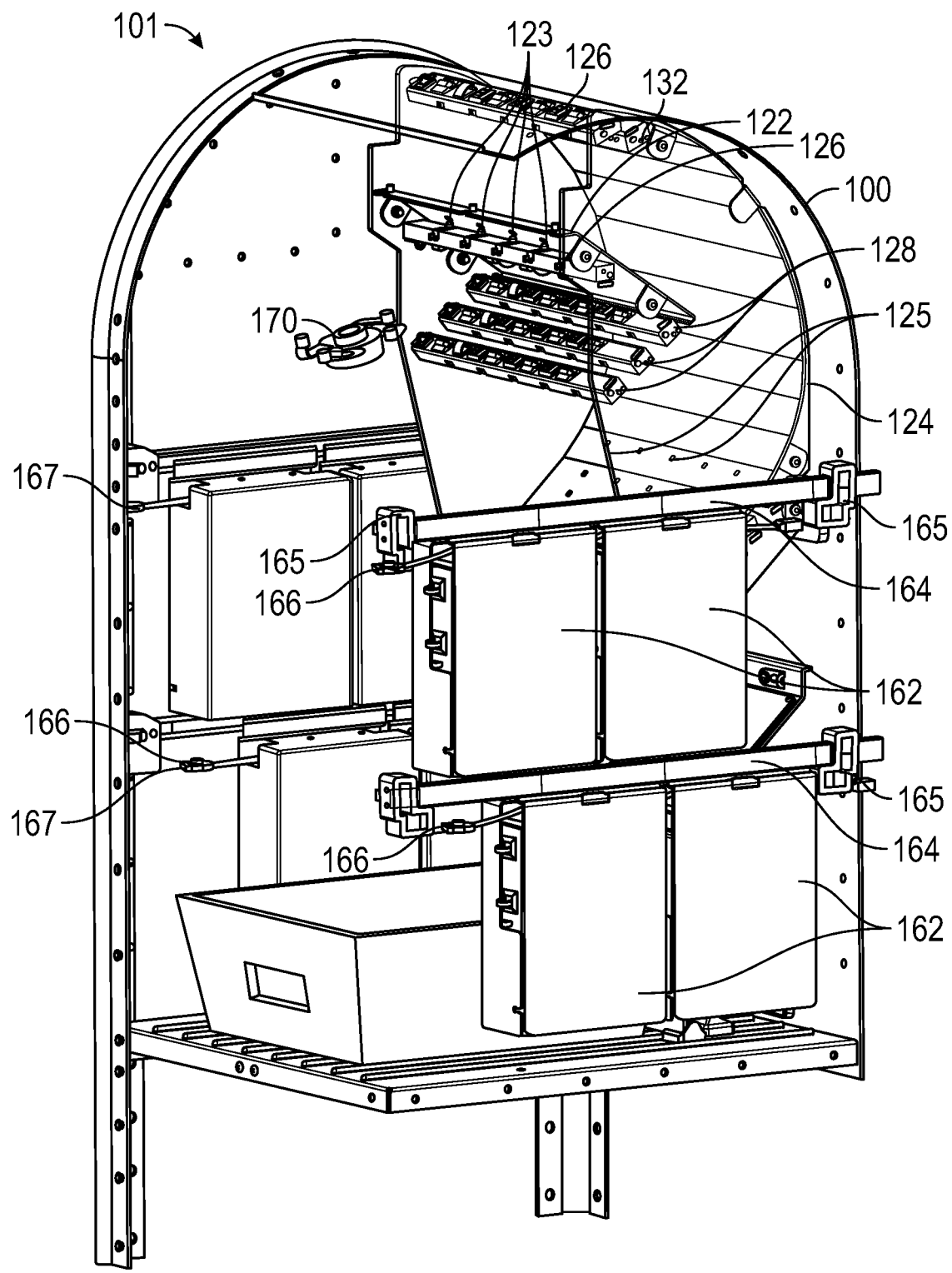
FIG. 5 is a partial cutaway perspective view of the intelligent item receptacle of FIG. 4.
Figure 6:
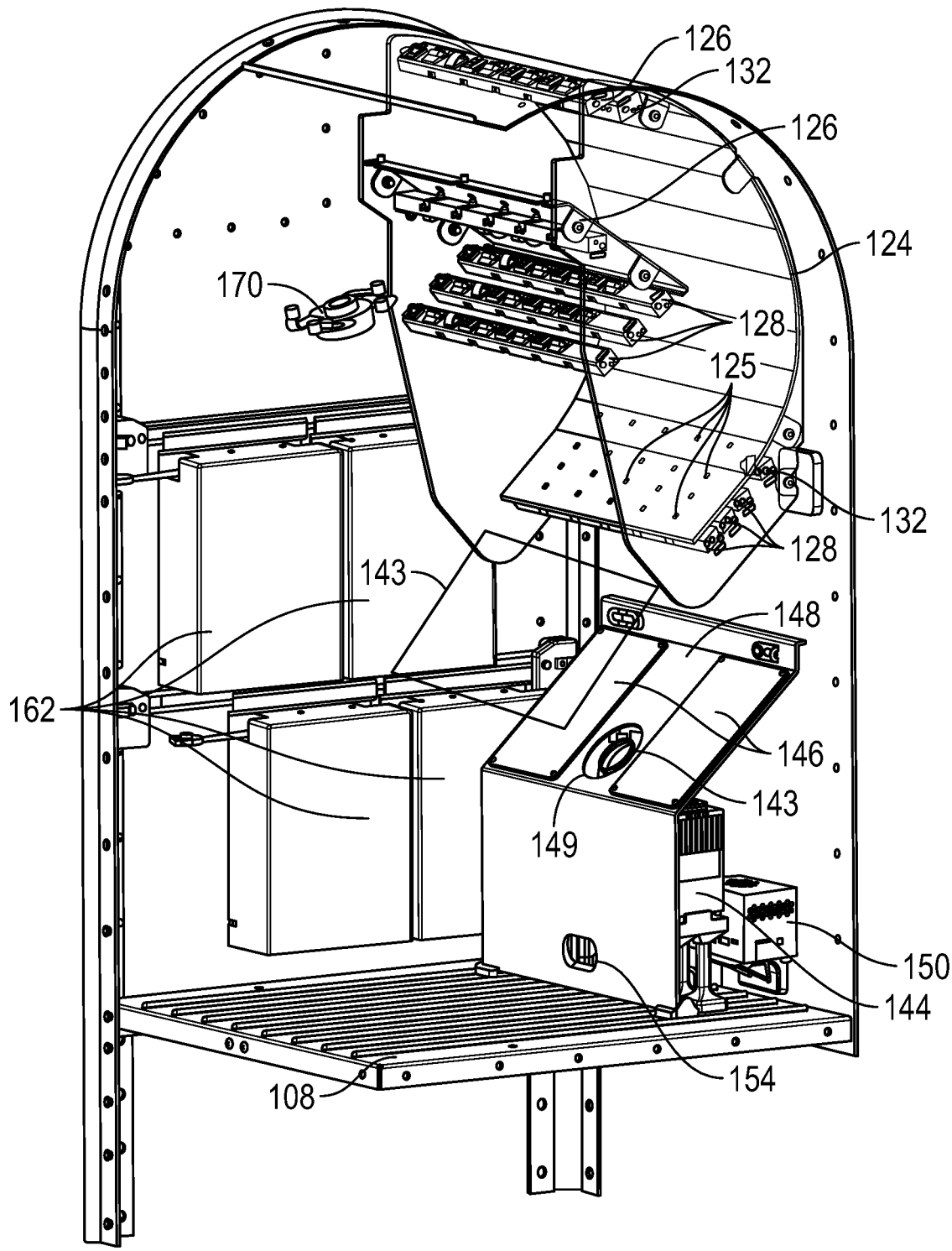
FIG. 6 is a further cutaway perspective view of the intelligent item receptacle of FIGS. 4 and 5.
Figure 7:
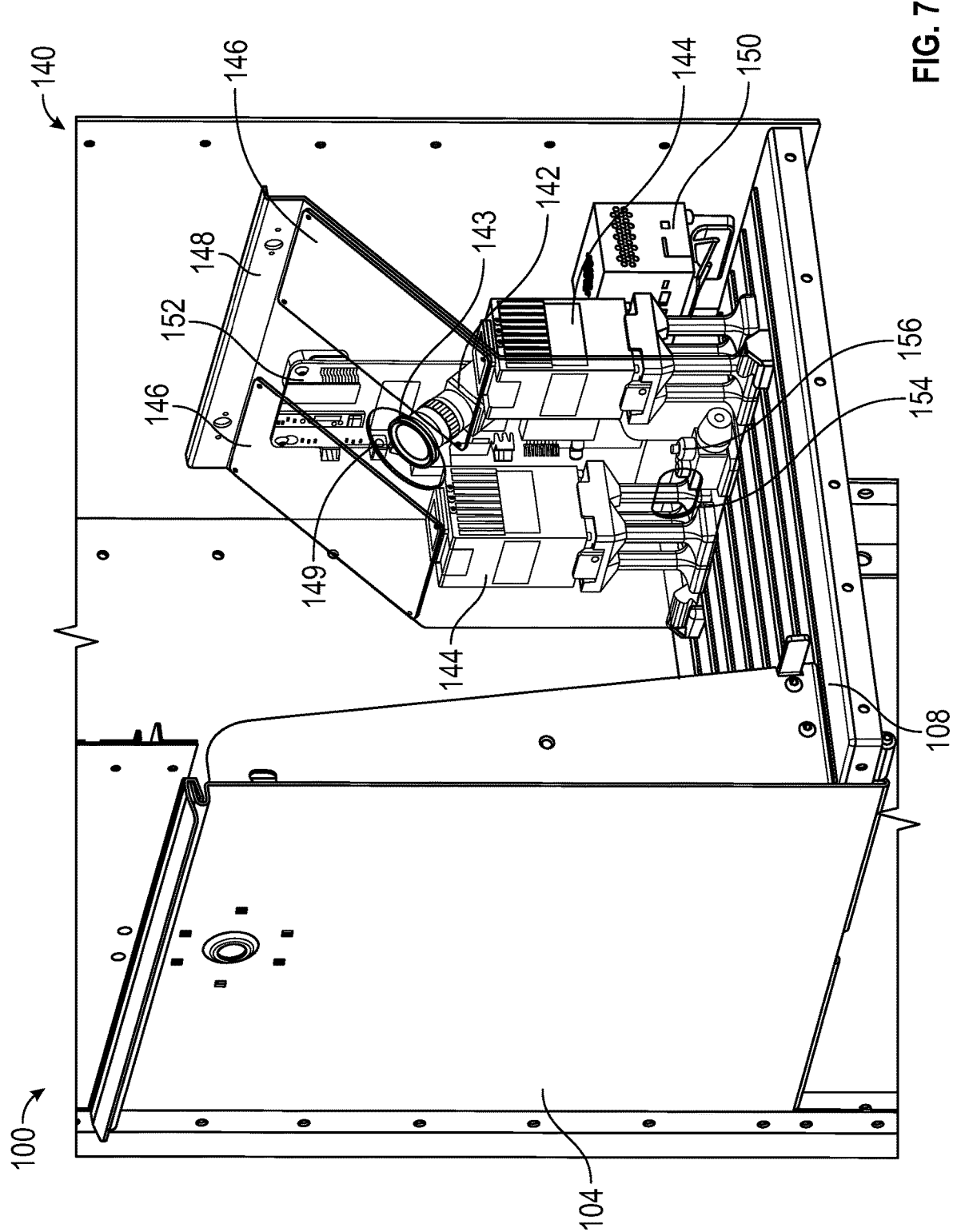
FIG. 7 is a cutaway perspective view of example image collection components of the intelligent item receptacle of FIGS. 4-6.

FIGS. 4-7 depict an example embodiment of an intelligent item receptacle 101. The intelligent item receptacle 101 includes an item receptacle 100 consistent with the item receptacle 100 of FIGS. 1 and 2, with additional components installed in the interior thereof. In some embodiments, the intelligent item receptacle 101 may be produced by retrofitting the additional interior components into an existing item receptacle 100. FIG. 4 is a cutaway side view of the intelligent item receptacle 101. FIG. 5 is a cutaway perspective view in which side and front portions of the exterior of the item receptacle 100 are removed. FIG. 6 is a further cutaway view similar to the view of FIG. 5. FIG. 7 is a close cutaway perspective view with transparency to illustrate internal components of the imaging system 140.

The intelligent item receptacle 100 includes the components illustrated in FIGS. 1 and 2, as well as an item detection and tracking system 120, an imaging system 140, a power supply system 160, and an output device 170. As will be described in greater detail, the item detection and tracking system 120 is configured to detect when an item is deposited into the intelligent item receptacle 100, and to track the progress of the item such that it can be reliably imaged by the imaging system 140. The power supply system 160 provides electrical power to the item detection and tracking system 120, the imaging system 140, and the output device 170. The output device 170 is configured to present media, such as audio, images, video, etc., to observers outside the intelligent item receptacle 100, such as to a sender/depositor of the item and/or others in the immediate area.

The item detection and tracking system 120 includes an upper item guide 122, a lower item guide 124, and a plurality of sensors mounted in the vicinity of the upper item guide 122 and lower item guide 124. The upper item guide 122 includes an inclined plane disposed such that an item inserted at the item intake 106 slides downward along the upper item guide 122 toward the lower item guide 124. The lower item guide 124 is curved to fit within the interior volume of the item receptacle 100, transitioning to an inclined planar lower portion 130 in order to direct the item in a desired direction. The inclined planar lower portion 130 of the lower item guide 124 is disposed such that an item sliding off of the upper item guide 122 contacts the lower item guide 124, slides along the inclined planar lower portion 130, and slides off of the inclined planar lower portion 130 into a field of view 143 of one or more cameras 142, 142' of the imaging system 140.

An intake sensor including a pair of intake sensor bars 126, a plurality of item sensors including pairs of item sensor bars 128, and a jam detector including a pair of jam detector sensor bars 132 are mounted about the upper item guide 122 and the lower item guide 124. The intake sensor includes intake sensor bars 126 disposed above and below the upper item guide 122. One or both of the intake sensor bars 126 include light sources (e.g., infrared light sources) configured to direct beams of light through apertures 123 in the upper item guide 122 toward corresponding detectors on the other intake sensor bar 126. When an item such as a letter or flat is inserted through the item intake 106, the item interrupts at least one of the beams, causing the detector corresponding to the interrupted beam to send a signal to a processor 152 indicating that an item has been detected. In some embodiments, the intake sensor 126 operates continuously or periodically so as to detect any item inserted through the item intake 106. The processor 152 may be similar to the processor 305 described with reference to FIG. 3.

The item sensors include item sensor bars 128 disposed above and below the inclined planar lower portion 130 of the lower item guide 124. The item sensor bars 128 may be arranged in pairs. Although the example embodiment illustrated in FIGS. 4-7 includes three pairs of item sensor bars 128, various embodiments may include only one pair, two pairs, or four or more pairs of item sensor bars 128. One or both bars of each pair of item sensor bars 128 include light sources (e.g., infrared light sources) configured to direct beams of light through apertures 125 in the lower item guide 124 toward corresponding detectors on the other of each pair of item sensor bars 128. The light sources of the item sensor bars 128 may be activated by the processor 152, for example, based on the detection of an item by the intake sensor bars 126. As the detected item travels downward along the inclined planar lower portion 130 of the lower item guide 124, the item interrupts at least one of the beams of each pair of item sensor bars 128, causing the detector corresponding to each interrupted beam to send a signal to the processor 152 indicating that the item has been detected. In some embodiments, the processor 152 uses the time interval, offset, or spacing of the signal received from each pair of item detector bars 128 to calculate a speed of the item and/or an expected time at which the item will be substantially within the field of view of the cameras 142, 142'. In some embodiments, the intelligent item receptacle 101 has only one pair of sensor bars 128 therein.

The jam detector includes jam detector sensor bars 132 disposed about an upper portion of the lower item guide 124. One or both of the jam detector sensor bars 132 include light sources (e.g., infrared lights sources) configured to direct beams of light through apertures 125 in the lower item guide 124 toward corresponding detectors on the other jam detector sensor bar 132. The pair of jam detector sensor bars 132 are located such that at least one of the beams will remain interrupted if an item slides down the upper item guide 122 but does not travel all the way down the lower item guide 124. The jam detector may be activated immediately upon detection of an item by the intake sensor bars 126, or after a time interval such as 0.5 seconds, 1 second, 5 seconds, 10 seconds, etc., following the detection of an item at the intake sensor. The time interval may be long enough to allow a typical item to pass clear of the jam detector such that an item remaining in the path of one or more of the jam detector beams after the time interval is likely to be stuck rather than continuing to move along the lower item guide 124. If the jam sensor is activated upon intake of the item as detected by the intake item sensors 126, the processor 152 can determine an item is jammed if the jam detector sensor bars 132 have a signal that remains interrupted for a given length of time, which is longer than the length of time it should nominally take an item to move down the upper item guide, onto and off of the lower item guide 124 and the inclined lower planar portion 130.

In some embodiments, the jam detector is activated on a periodic basis (e.g., every 30 seconds, every minute, every 5 minutes, etc.) rather than each time an item is detected. If an item becomes stuck rather than continuing to move down the lower item guide 124, the item interrupts at least one of the beams of the jam detector, causing the detector corresponding to the interrupted beam to send a signal to the processor 152 indicating that a jam has been detected.

When a jam is detected, the processor 152 may responsively deactivate the intake sensor bars 126, the item sensor bars 128, the imaging system 140, and/or the output device 170, and may further send a signal to a server of the distribution network indicating that a jam was detected.

The imaging system 140 includes one or more cameras 142, 142' located and arranged within the inner volume 102 so as to image the field of view 143 downstream of the inclined planar lower portion 130 of the lower item guide 124, such that items sliding off of the inclined planar lower portion 130 are directed to pass through the field of view 143 where they can be imaged. Some embodiments include only a single camera 142 or 142', while some embodiments may include both cameras 142 and 142' such that postage indicia on flat items can be imaged reliably regardless of the orientation of the items when inserted at the item intake 106. The cameras 142, 142' capture one or a series of image frames based on a signal from the processor 152. In some embodiments, the processor 152 causes the cameras 142, 142' to begin capturing images immediately after the trailing edge of the item passes the last (e.g., furthest downstream) pair of item sensor bars 128 (e.g., when all beams of the last pair of item sensor bars 128 are restored or no longer interrupted). In some embodiments, the processor 152 causes the cameras 142, 142' to begin capturing images after a time delay following the restoration of the signal from the last pair of item sensor bars 128, such as a predetermined constant time delay or a time delay calculated based on nominal item travel time within the interior volume 102, which can be set or changed as needed. In some embodiments, the processor 152 causes the cameras 142, 142' to begin capturing images at or after a certain time calculated for each item based on a speed of the item determined at the processor 152 using input from the intake sensor bars 126 and one or more of the pairs of item sensor bars 128.

Because the imaging system 140 is disposed within an unilluminated, enclosed intelligent item receptacle 101 that may have an opaque exterior, one or more flashes 144 may be included to provide illumination for the imaging system 140. In some embodiments, the flashes 144 direct intense broad-spectrum light (e.g., white light) towards one or more translucent or transparent diffuser panels 146 that diffuse the light from the flashes 144 so as to reduce glare on the surface of the imaged item that may inhibit reliable image processing. The imaging system 140 may be protected from impacts (e.g., from falling items within the intelligent item receptacle 101) by a shield 148 covering at least the top and an inward-facing side of the imaging system 140. The shield 148 can include an imaging aperture 149 near the lens 143 of camera 142 to allow the camera 142 to take photographs through the shield 146. An access aperture 154 allows a technician, item carrier, or other authorized user accessing the intelligent item receptacle 101 through the door 104 to access a switch 156 to activate and/or deactivate the electrically powered features of the intelligent item receptacle 101 (e.g., the item detection and tracking system 120, the imaging system 140, and/or the output device 170).

After the camera or cameras 142, 142' image the field of view 143, the captured images are analyzed to detect media indicia, postage indicia, or other visual features on the surface of the item. The image analysis may occur at the processor 152, or may be at least partially performed by a separate image processing component 150 in communication with the processor 152 and/or at least partially performed by one or more remote computing resources, such as the server 365 described with reference to FIG. 3 and/or another networked resource. The image processing component 150 and/or other image processing resources may be similar to the processor 305, memory 310, and/or other components described with reference to FIG. 3 or portions thereof. The images may be analyzed by various known feature detection methods to identify any known patterns or image components located on the imaged item. For example, the images may be analyzed to detect one or more special postage indicia, such as commemorative stamps, associated with audio, visual, or audiovisual media to be played in response to depositing the item. In another example, the images may be analyzed to detect indicia of metered postage or item tracking indicia, which may be in the form of a string of alphanumeric characters and/or a machine-readable code such as a barcode or QR code. Where a barcode or other computer readable code is identified, the processor 152 can be configured to read and/or decode the computer readable code. Indicia of metered postage may be used, in conjunction with a weight measurement of the item from a weight sensor in the floor 108, to determine if sufficient postage has been paid for the weight of the item, and/or to determine if a deposited item is heavier than an allowable weight threshold for deposit at the intelligent item receptacle 101. In some embodiments, the weight of each item added to the item receptacle can be determined based on an incremental weight increase over the previous weight. Item tracking indicia may be used to record an induction scan of the item, such as to confirm that the item has been received in the distribution network and/or to begin tracking the item along its transit to its intended destination. In another example, images may be analyzed to detect indicia of safety or security threats. For example, an image of a parcel or a large flat that bears stamps rather than metered postage may be flagged as a potentially suspicious item. The image and/or a notification can be sent to an agent of the distribution network and/or law enforcement personnel, and action may be taken, including dispatching someone to investigate the item.

An output device 170 is included within the intelligent item receptacle 101 to output audio, visual, or audiovisual content based on detection of special postage indicia associated with the media content. In the example embodiment illustrated in FIGS. 4-7, the output device 170 is a sound transducer coupled in contact with a sound output surface 172 of the item receptacle 100. Audio content in the form of an analog or digital electrical signal sent from the processor 152 to the output device 170 is converted to a vibrational output by the sound transducer. The vibrational output is transferred to the sound output surface 172 such that the sound output surface 172 functions as a speaker and plays the audio content at a volume audible to people standing in the immediate vicinity of the intelligent item receptacle 101. In other embodiments, the output device 170 may include one or more of a speaker, a display screen, or the like.

The power supply system 160 includes one or more battery modules 162 disposed within the intelligent item receptacle 101 and electrically connected to the item detection and tracking system 120, the imaging system 140, and the output device 170. The battery modules 162 may be any known type of energy storage medium and may be selected to contain enough energy to power the intelligent item receptacle 101 for a desired period of time, such as 1 day, 2 days, 3 days, 1 week, 2 weeks, 1 month, or longer. When the battery modules 162 run low or at a predetermined battery replacement interval within the expected charge depletion life of the battery modules 162, an item carrier or other agent of the distribution network may replace the battery modules 162 with freshly charged replacement battery modules. The battery modules 162 may be mounted on conductive rails 164 such that they can be individually removed by sliding and/or lifting to facilitate the insertion and removal of the battery modules 162 through the relatively limited size of the door 104. The battery modules 162 can hang on the rails 164. The battery modules 162 include detachable power connectors 166 to allow the battery modules 162 to be quickly connected to and/or disconnected from the electrically powered systems of the intelligent item receptacle 101. The detachable power connectors 166 are connected to power ports 167 within the internal volume 102. The power ports 167 supply the power from the battery modules 162 to the electrical components described above.

The rails 164 and other components mounted within the internal volume described herein may be mounted to the interior sides of the surrounding item receptacle 100 without an external penetration in the sidewalls of the item receptacle 100. As shown, the components described above are connected to or between a pair of sidewalls 103. The sidewalls 103 are and the rails 164 are mechanically connected to a plurality of mounting brackets 165.

The plurality of mounting brackets 165 can include a plurality of channels therein. The mounting brackets 165 can be secured to the internal surfaces of the item receptacle 101 by flowing one or more adhesives through channels in mounting brackets 165. In some embodiments, a combination of two different adhesives may be used. For example, a first adhesive may be an acrylate adhesive or the like, selected to retain strength across a wide range of temperatures, but which may be relatively brittle. The first adhesive can be flowed into a subset of the plurality of channels, such as ⅓ or ½ of the available channels in the mounting bracket. A second adhesive may be an epoxy or the like, selected to be more flexible once cured. Thus, a combination of adhesives may provide desirable adhesive properties across a wide range of operating temperatures as may be encountered in winter and summer seasons. The second adhesive may be flowed into the remaining subset of the plurality of channels which did not receive the first adhesive. Using mounting brackets 165 and attaching the brackets to the interior surfaces of the volume 102 allows the systems described herein to be applied to a conventional item receptacle, such as a retrofit, without needing to make any penetrations or holes in the sides of the item receptacle.

Figure 8:
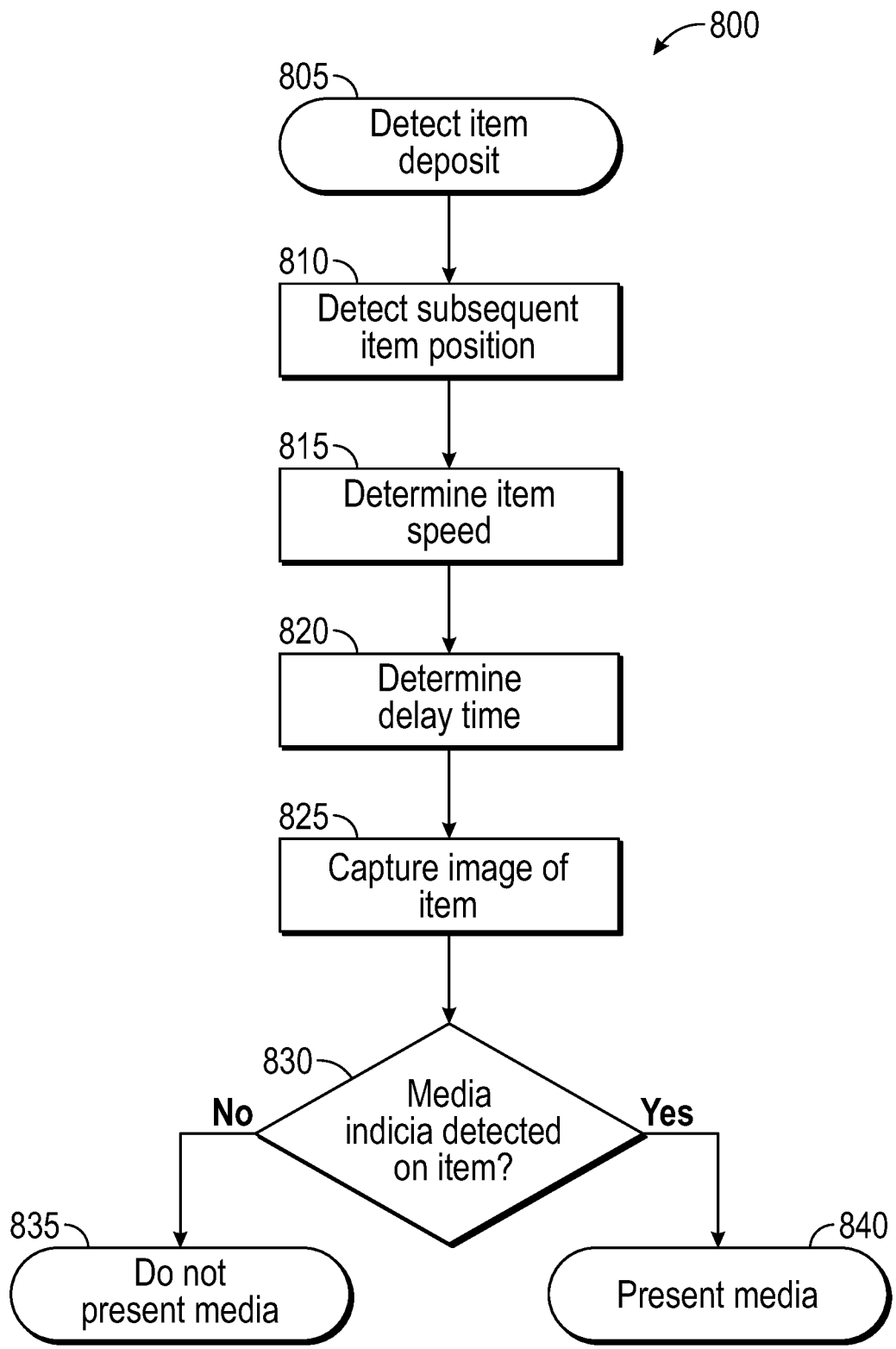
FIG. 8 is a flowchart illustrating an example method of identifying an item deposited in an intelligent item receptacle.

FIG. 8 is a flowchart illustrating an exemplary method 800 of selectively presenting media at an intelligent item receptacle. The method 800 can be implemented by any of the intelligent item receptacles 101, 300 described herein. The method 800 can be performed by a computer system integrated within the intelligent item receptacles 101, 300. For example, the method 800 can be performed at least in part under control of components such as the processor 152 or 305, and/or an image processing component 150. It will be appreciated that some or all steps of the method 800 can be performed locally and/or remotely. For example, in some embodiments the entire method 800 can be performed locally at an intelligent item receptacle 101, 300 based on information and computer executable instructions stored within a memory 310 of the intelligent item receptacle 300, or the method 800 can be performed by the intelligent item receptacle 101, 300 at least partly based on information and/or computer executable instructions stored within a remote memory such as the database 370.

The method 800 begins at block 805 when an item deposit is detected at the intelligent item receptacle 101, 300. The item deposit may be detected based on a signal received at the processor 305 from an intake sensor 345. In the example intelligent item receptacle 101 of FIGS. 4-7, the signal may be received at the processor 152 from intake sensor bars 126 based on a deposited item interrupting one or more of the light beams of the intake sensor bars 126. When the item deposit has been detected, the method 800 continues to block 810.

At block 810, at least one subsequent item position is detected within the intelligent item receptacle 101, 300. The at least one subsequent item position may be detected based on one or more signals received at the processor 305 from the item sensors 315. In the example intelligent item receptacle 101 of FIGS. 4-7, the signals may be received at the processor 152 from each pair of item sensor bars 128 as the item travels along the lower item guide 124. The processor 305 may further receive and/or determine a timestamp associated with each signal from the item sensors 315. In some embodiments, the intelligent item receptacle comprises only one pair of sensor bars 128. When at least one subsequent item position has been determined, the method 800 continues to block 815.

At block 815, an item speed is determined. The speed of the item may be determined based on the timestamps associated with the signals received from the item sensors 315, 128 and known locations of the item sensors 315, 128. For example, the speed of the item may be calculated at the processor 152, 305 by dividing the known distance between two of the item sensors 315, 128 by the time taken by the item to travel between the two item sensors 315, 128 (e.g., the time difference between the timestamps associated with the signals from the item sensors 315, 128). In some embodiments, the processor 305 does not determine item speed, for example, where there is only one pair of sensor bars 128. In this case, the processor 305 identifies a time when the deposited item clears the pair of item sensor bars 128. When the speed of the item has been determined, the method 800 continues to block 820.

At block 820, a delay time is determined. As described above with reference to FIGS. 4-7, the delay time is the time period that will be allowed to pass between the time when the trailing edge of the item clears the final item sensor 128, 315 and the time when the imaging system 140, 320 will begin capturing images of the item. The delay time may be predetermined, or may be calculated based on the speed of the item determined at block 815. In some embodiments, a variety of delay times associated with detected item speeds may be stored in a lookup table in the memory 310 of the intelligent item receptacle 300, such that the processor 305 can quickly determine the appropriate delay time by consulting the lookup table. The predetermined delay times in the lookup table corresponding to each item speed or range of item speeds may be selected based on prior testing of sample intelligent item receptacles. In some embodiments, the delay time is a set time that begins when the last, or only pair of item sensor bars 128 detects passage of the item, for example, when the beam of the last or only pair of item sensor bars 128 is restored after an interruption. Moreover, in some embodiments, the lookup table may store delay times associated with elapsed times between two sensor timestamps such that the delay time may be determined from the lookup table without determining an item speed. In some embodiments, a delay time is not determined, and the camera or cameras 142, 142' begin capturing images when the item sensor bars 128 detect the passage of the item, and the camera or cameras 142, 142' capture a plurality of images, a subset of which will have images of the item, and some others of the plurality may not have images of the item. After a delay time is determined, the method 800 continues to block 825.

At block 825, the camera or cameras 142, 142', 325 capture one or more images of the item. Flashes 144, 330 may illuminate the item during image capture to improve the quality of the image. If a delay time is used, imaging system 140, 320 allows the delay time determined at block 820 to elapse after the item clears the final item sensor 128, 315 before capturing images. If no delay time is used (e.g., if the delay time determined at block 820 is zero), the imaging system 140, 320 begins capturing images as soon as it is determined that the item has cleared the final item sensor 128, 315. In some embodiments, the imaging system 140, 320 captures a rapid sequence of images, such as 5 images, 10 images, 20 images, or more. After the one or more images of the item are captured, the method 800 continues to decision state 830.

At decision state 830, the processor 152, 305 determines whether known media indicia are detected on the item. The processor 152, 305 and/or an additional image processing component 150 analyzes the images captured by the camera or cameras 142, 142', 325 using suitable image analysis and/or feature detection algorithms to identify known indicia within the images. The known indicia can be a trigger image, which, when received and recognized, causes the processor 305 to present media or additional content, or to take additional steps, such as recording, tracking, notifying, etc., as described elsewhere herein. For example, known indicia may include known commemorative stamp images, computer-readable postage indicia, computer-readable item identification indicia, or the like.

In one example process of determining whether known media indicia are detected, the processor 152, 305 receives a sequence of images from the imaging system 140, 320. For example, the processor 152, 305 may receive a sequence of 10 images taken in rapid succession as the item passes the camera or cameras 142, 142', 325. The processor 152, 305 may cause the images to be stored in the memory 310. Each of the images may thus show a portion of the item or the full item, and each individual image may or may not include a full and detectable image of known media indicia even if such indicia are on the item, due to the motion of the item relative to the camera or cameras 142, 142', 325. However, if known media indicia are present, it is likely that at least one of the images in the sequence includes a detectable image of the known media indicia. In order to efficiently process the images, the processor 152, 305 begins with the first image in the sequence and analyzes the first image to determine if known media indicia are detected. If known media indicia are not detected, the processor 152, 305 continues analyzing each image in order until known media indicia are detected. If known media indicia are detected in an image before all of the images in the sequence have been analyzed, the processor 152, 305 stops analyzing images, determines that known media indicia have been detected, and causes the full sequence of images to be deleted from the memory 310. If the processor 152, 305 finishes analyzing all of the images in the sequence without detecting known media indicia in any of the images, the processor 152, 305 determines that known media indicia have not been detected on the item, and causes the full sequence of images to be deleted from the memory 310. If the processor 152, 305 determines at decision state 830 that the image or images of the item do not contain any known indicia associated with stored media content, the method 800 continues to block 835, where the method 800 terminates without any media content being presented to bystanders and the intelligent item receptacle 101, 300 waits to detect the next item deposit.

If the processor 152, 305 determines at decision state 830 that media indicia are detected or that a trigger image is present (e.g., the item includes a commemorative stamp or other indicia affixed thereto associated with stored media content), the method 800 continues to block 840. At block 840, the method terminates as the processor 152, 305 causes the output device 170, 335 to present the corresponding media. For example, the processor 152, 305 may retrieve the corresponding media file from the memory 310 and send the media file to the output device 170, 335 to cause the output device 170, 335 to play the audio, visual, or audiovisual content contained therein. In some embodiments, the processor 152, 305 may select one media file from a plurality of media files corresponding to the detected media indicia, randomly or in a predetermined sequence. After presenting the media, the intelligent item receptacle 101, 300 waits to detect the next item deposit. In some embodiments, wherein the image detects postage and compares weight, identifies a sender, and the like, the steps of presenting or not presenting media may be omitted, or may not be performed.

The processor 152, 305 can create or store a counter or indicator, indicative of the receipt of the item having the indicia thereon, and/or a counter of the number of times the media is presented. The indicator or counter information can be provided to the distribution network or to the sender/generator of the item to indicate a quantity or number of items being deposited. The processor 152, 305 can also determine the location of the item receptacle receiving the item which increments the counter or increments the indicator, or which creates the record of the deposit, such that the distribution network, sender, or creator of the item can perform analytics and generate metrics regarding item deposits. The information can be communicated from the processor 152, 305 to the server 365 via the network 360. In some embodiments, the image data is not sent, but only data regarding the instance of the item detection, the location of the receptacle, time of day, etc.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged, or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An item receptacle comprising:
   an interior volume;
   an intake item guide disposed within the interior volume;
   an intake sensor oriented proximate the intake item guide, the intake sensor emitting a light beam;
   a receiving item guide positioned proximate the intake item guide, the receiving item guide and the intake item guide forming a receiving channel therebetween;
   a jam detector sensor configured to detect items in the receiving channel, the jam detector sensor having an activatable light beam; and
   a processor in communication with the intake sensor and the jam detector sensor, the processor configured to:
   receive an intake signal from the intake sensor when an item breaks the light beam of the intake sensor;
   determine that a predetermined delay time has elapsed since the intake signal was received from the intake sensor;
   in response to determining that the predetermined time delay has elapsed, activate the jam detector sensor to produce the activatable light beam;
   receive a jam signal from the jam detector sensor when the item breaks the activatable light beam of the jam detector sensor; and
   determine that the item is jammed in the receiving channel based on the received jam signal.

2. The item receptacle of claim 1, wherein the processor determines that the item is jammed when the activatable light beam of the jam detector sensor is interrupted for a specified length of time.

3. The item receptacle of claim 1, wherein the processor is further configured to send a signal to a remote server upon determining that the item is jammed in the interior volume.

4. The item receptacle of claim 1, wherein the processor is further configured to deactivate the intake sensor after determining that the item is jammed in the interior volume.

5. The item receptacle of claim 1, wherein the processor is further configured to activate the intake sensor to emit the light beam periodically.

6. The item receptacle of claim 1, wherein the jam detector sensor comprises a plurality of jam detector sensors configured to detect a jam in the receiving channel.

7. The item receptacle of claim 1, wherein the interior volume and the receiving channel are accessible for deposit of the item by an item intake.

8. The item receptacle of claim 1, further comprising a power supply system configured to provide power to the processor, the jam detector sensor, and the intake sensor.

9. The item receptacle of claim 1, wherein the predetermined delay time is greater than or equal to an expected travel time for the item to pass from the intake sensor and past the jam detector sensor.

10. A method comprising:
   detecting, by an intake sensor disposed within an interior volume of an item receptacle, a deposit of an item into the item receptacle;
   receiving, at a processor, an intake signal from the intake sensor;
   determining, by the processor, that a predetermined delay time has elapsed since the intake signal was received from the intake sensor;
   activating, by the processor in response to determining that the predetermined time delay has elapsed, a jam detector sensor disposed within the interior volume of the item receptacle;
   receiving, at the processor, a jam signal from the jam detector sensor when the item breaks a light beam of the jam detector sensor; and
   determining, by the processor, that the item is jammed within the item receptacle based on the received jam signal.

11. The method of claim 10, wherein determining that the item is jammed comprises determining, by the processor, that the light beam of the jam detector sensor is interrupted for a specified length of time.

12. The method of claim 10, further comprising sending, by the processor, a signal to a remote server after determining that the item is jammed within the item receptacle.

13. The method of claim 10, further comprising deactivating, by the processor, the intake sensor after determining that the item is jammed within the item receptacle.

14. The method of claim 10, wherein detecting by the intake sensor the deposit of the item comprises:
   receiving, in the processor, a signal indicating an interruption of a light beam produced by the intake sensor.

15. The method of claim 10, wherein activating the jam detector sensor comprises:
   activating the light beam of the jam detector sensor.

16. The method of claim 10, wherein the predetermined delay time is greater than or equal to an expected travel time for the item to pass from the intake sensor and past the jam detector sensor.

* * * * *